United States Patent [19]

Sachs

[11] 3,868,642

[45] Feb. 25, 1975

[54] HIERRARCHIAL ASSOCIATIVE MEMORY SYSTEM

[75] Inventor: Harold Sachs, Faistenhaar, Germany

[73] Assignee: Siemens Aktiengesellschaft, Berlin, Germany

[22] Filed: Aug. 21, 1972

[21] Appl. No.: 282,382

[30] Foreign Application Priority Data

Aug. 25, 1971 Germany .......................... 2142634

[52] U.S. Cl. .......................................... 340/172.5

[51] Int. Cl... G06f 13/00, G11c 15/00, G11c 17/00

[58] Field of Search ................................ 340/172.5

[56] References Cited

UNITED STATES PATENTS

| | | | |
|---|---|---|---|
| 3,292,159 | 12/1966 | Koerner | 340/172.5 |
| 3,426,329 | 2/1969 | Marx et al. | 340/172.5 |
| 3,431,558 | 3/1969 | Capozzi | 340/172.5 |
| 3,465,310 | 9/1969 | Apicella et al. | 340/174 |
| 3,568,159 | 3/1971 | Igarashi | 340/172.5 |
| 3,601,812 | 8/1971 | Weisbecker | 340/172.5 |
| 3,602,899 | 8/1971 | Lindquist | 340/172.5 |
| 3,623,158 | 11/1971 | Llewelyn et al. | 340/172.5 |
| 3,685,020 | 8/1972 | Meade | 340/172.5 |
| 3,693,165 | 9/1972 | Reiley et al. | 340/172.5 |
| 3,701,984 | 10/1972 | Burns | 340/172.5 |

*Primary Examiner*—Raulfe B. Zache
*Assistant Examiner*—Jan E. Rhoads
*Attorney, Agent, or Firm*—Hill, Gross, Simpson, Van Santen, Steadman, Chiara & Simpson

[57] ABSTRACT

An associative memory having a non-associative portion for storing data words and an associative portion for storing the associated addresses, whereby a data word in the non-associative portion is triggered when an offered address coincides with the associated address in the associative portion, the memory employing a main associative memory having the data words in its storage cells in non-associative portions thereof and the low value adress digits of the data words in ;the associative portions, and a selection memory embodies as an associative memory having the higher value address digits of the data words written into the main associative memory contained in its storage cells and operable to produce a concidence signal during selection of the storage cell of the selection memory which simultaneously serves to trigger the storage cells of the main associative memory whose contents have the same higher value address digits.

4 Claims, 4 Drawing Figures

HIERRARCHIAL ASSOCIATIVE MEMORY SYSTEM

BACKGROUND OF THE INVENTION

1. Field of the Invention

This invention relates to an associative memory including a non-associative section for storing data words and an associative section for storing the associative addresses, in which a data word is triggered in a non-associative section when an offered address coincides with the associated address in the associative section.

2. Description of the Prior Art

Associative memory techniques are taught in U.S. Pat. Nos. 3,257,650; 3,104,380; and 3,031,650. An essential application of the associative memory resides in storing corresponding pairs of data signals. For this purpose, each storage cell of the associative memory is subdivided into an associative portion and a nonassociative portion. The associative portion contains a sequentially called data address; and the non-associative portion contains the data associated with this address, for example, a data word. If the data which is associated with a desired address is examined, the associative memory will offer the address which is then compared with the contents of the associative portions of all storage cells. In the case of equality, the corresponding storage cell of the associative memory will produce a coincidence signal, with the help of which the data can be emitted from the non-associative portion of the storage cell, or data can be entered into the non-associative portion of the storage cell.

A further advantage of the associative memory resides in its possible application as a fast, small, auxiliary memory, in connection with slower large memories, in order to allow fast access to the data of the large memory. In order to obtain this advantage, the most often used data words must be inserted into the associative memory, together with their respective addresses.

However, a drawback of the former associative memory lies in the fact that, when a data word is read from the associative memory, the full address is compared with all storage cells, and thus each storage cell must contain a number of binary digits determined by the value of the address.

SUMMARY OF THE INVENTION

It is therefore the object of the invention to provide an associative memory wherein the number of binary digits per address, and thus the cost of the associative memory, are essentially lower than heretofore known. The object is achieved by the provision of a main associative memory wherein the data words are stored in its memory cells in the non-associative portions, and the low value address digits of the data words are stored in the associative portion, and a pre-selection memory, embodied as an associative memory, has the same higher value address digits of the data words stored in the main associative memory also stored therein. The pre-selection memory produces a coincidence signal during the selection of a storage cell and this signal is simultaneously employed to trigger the storage cells of the main associative memory which are assigned with the same higher value address digits.

The associative memory according to this invention may advantageously be constructed in a hierarchal manner. A decrease of the number of binary digits per address is obtained in such a way that the higher value address digits which are common to the contents of the nonassociative portion of the main associative memory are written into a storage cell of the pre-selection memory.

BRIEF DESCRIPTION OF THE DRAWINGS

Other objects, features and advantages of the invention, together with its organization, construction and operation will be best understood by the following detailed description of a preferred embodiment of the invention taken in conjunction with the accompanying drawings, on which.

DESCRIPTION OF THE PREFERRED EMBODIMENTS

Figure 1:
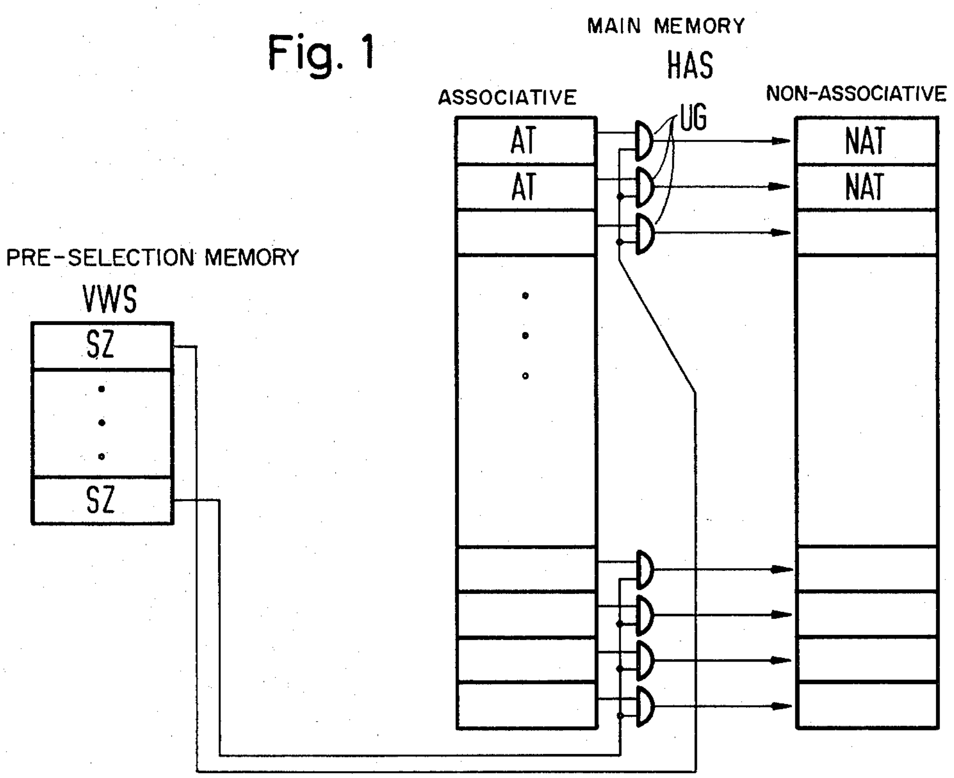
FIG. 1 is a logic diagram illustrating a first exemplary embodiment of the associative memory according to the present invention.

In FIG. 1, a main associative memory is referenced HAS, and a pre-selection memory is referened VWS. The pre-selection memory VWS, which is also exclusively constructed as an associative memory, comprises a plurality of storage cells SZ. The main associative memory HAS also comprises storage cells which, however, are subdivided into an associative portion AT and a non-associative portion NAT.

A data word is written into the non-associative portion NAT of the storage cell of the main associative memory HAS, and then the *n* low value address digits of the address of the data word are stored in the associative portion AT of the same storage cell. The *h* remaining digits of the address of the data word stored in the non-associative portion of the memory cell of the main associative memory are written in one of the storage cells SZ of the pre-selection memory VWS. Each memory cell of the main associative memory HAS is associated with an AND gate UG which causes the triggering of the non-associative portion NAT of the associated storage cell when both a coincidence signal from the associative portion AT of the main associative memory HAS and one from a storage cell SZ of the pre-selection memory VWS is supplied at its inputs. Since the higher value address digits of several contents of the non-associative portions NAT of the main associative memory HAS are equal, a corresponding number of AND gates UG can be combined to become a group and therefore be interconnected. The AND gates UG of such a group are then simultaneously supplied with a coincidence signal from one of the storage cells SZ of the pre-selection memory VWS.

If a data word, which is stored in the non-associative portion of the main associative memory HAS, is to be read, the *n* low value address digits of the address of the data word are offered to the associative portion of the main associative memory HAS, and the *h* higher value address digits are offered to the pre-selection memory VWS. The low value address digits are compared with the address digits provided in the associative portion of the main associative memory HAS and, in the case of equality, a coincidence signal is produced by the associative portion of the selected memory cell which is used to trigger the AND gate UG associated with this storage cell. Since the same address digits can occur in the associative portion of the several storage cells of the main associative memory HAS, coincidence signals may occur during this search process in several storage cells of the main associative memory and thus several AND gates UG can be triggered.

A searching process with the higher value digits of the data word will find place in the pre-selection memory VWS, simultaneously with the searching process in the associative portion of the main associative memory HAS. If the offered higher value address digits are equal to the content of one of the storage cells of the pre-selection memory VWS, a coincidence signal will also be produced and supplied to a group of AND gates UG, effecting a switching or true condition of the respective AND gate UG within the group, which a coincidence signal from the associative portion of the main associative memory HAS will also be provided with. The AND gate UG so rendered effective produces an output signal which causes the reading of the data word from the non-associative portion of the main memory.

When a data word is written into the main associative memory, the $h$ higher value address digits are first of all offered to the pre-selection memory VWS. If a coincidence signal occurs, the data word will be written into one of the storage cells of the storage sections in the main associative memory which is determined by the selected storage cell in the pre-selection memory VWS. If the pre-selection memory does not supply a coincidence signal, a storage cell of the pre-selection memory and the data in the main associative storage section corresponding to the storage cell must be erased before a new data word can be written.

If more addresses with the same $h$ higher value address digits are provided at the same time than there are storage cells in the main associative memory associated with the groups then these equal higher value address digits must be written into two, or possibly even more, storage cells of the pre-selection memory VWS.

Figure 2:
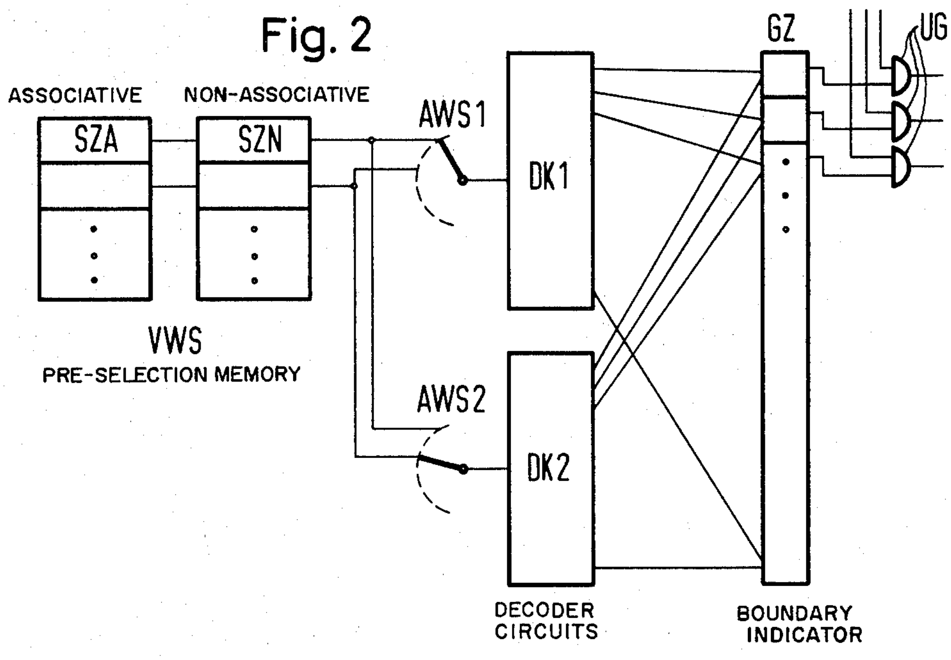
FIG. 2 is a logic diagram illustrating a second exemplary embodiment of the associative memory according to the present invention.
Figure 3:
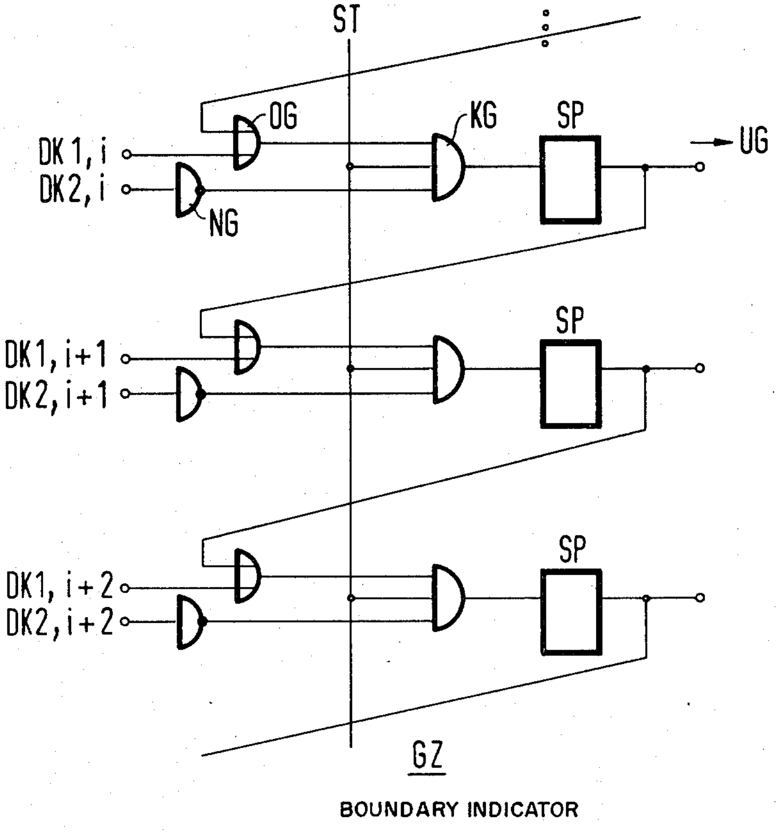
FIGS. 3 and 4 are schematic diagrams of circuits for use in the embodiment according to FIG. 2.

A further embodiment of the invention is illustrated in FIGS. 2 and 3. In this embodiment, the pre-selection memory VWS will have available an associative portion SZA, and a non-associative portion SZN. In the non-associative portion SZN of each storage cell of the pre-selection memory VWS is stored the upper limit of the storage section of the main associative memory HAS which is associated with the storage cell. For this purpose, the storage cells of the main associative memory HAS are provided with continuous cell numbers. In the non-associative portion of the storage cell of the pre-selection memory, the cell number will then be stored, which is the highest of the cell numbers associated with the higher value address digits stored in the associative portion of the storage cell of the pre-selection memory VWS and increased by 1. This cell number, stored in the non-associative portion of the storage cell of the pre-selection memory VWS is, however, simultaneously the lowest one of the cell numbers which are associated with the higher value address digits stored in the associative portion of the next storage cell of the pre-selection memory VWS. The last storage cell of the pre-selection memory VWS must always contain the highest cell number of the main associative memory, increased by 1. The storage cell preceding the first storage cell is fictitious and contains a 1.

Each storage cell of the main associative memory HAS is furthermore associated with a 1-bit memory. The entire set of these 1-bit memories is called a limit indicator GZ. Each storage cell in the main associative memory——which is not illustrated in FIG. 2 and whose construction can be taken from FIG. 1 --is again associated with an AND gate UG whose first input is provided with the coincidence signal from the associative portion of the storage cell of the main associative memory. The second inputs of the AND gates UG are not interconnected in a group manner. They are connected to the outputs of the associated 1-bit memories of the limit indicator GZ.

Figure 4:
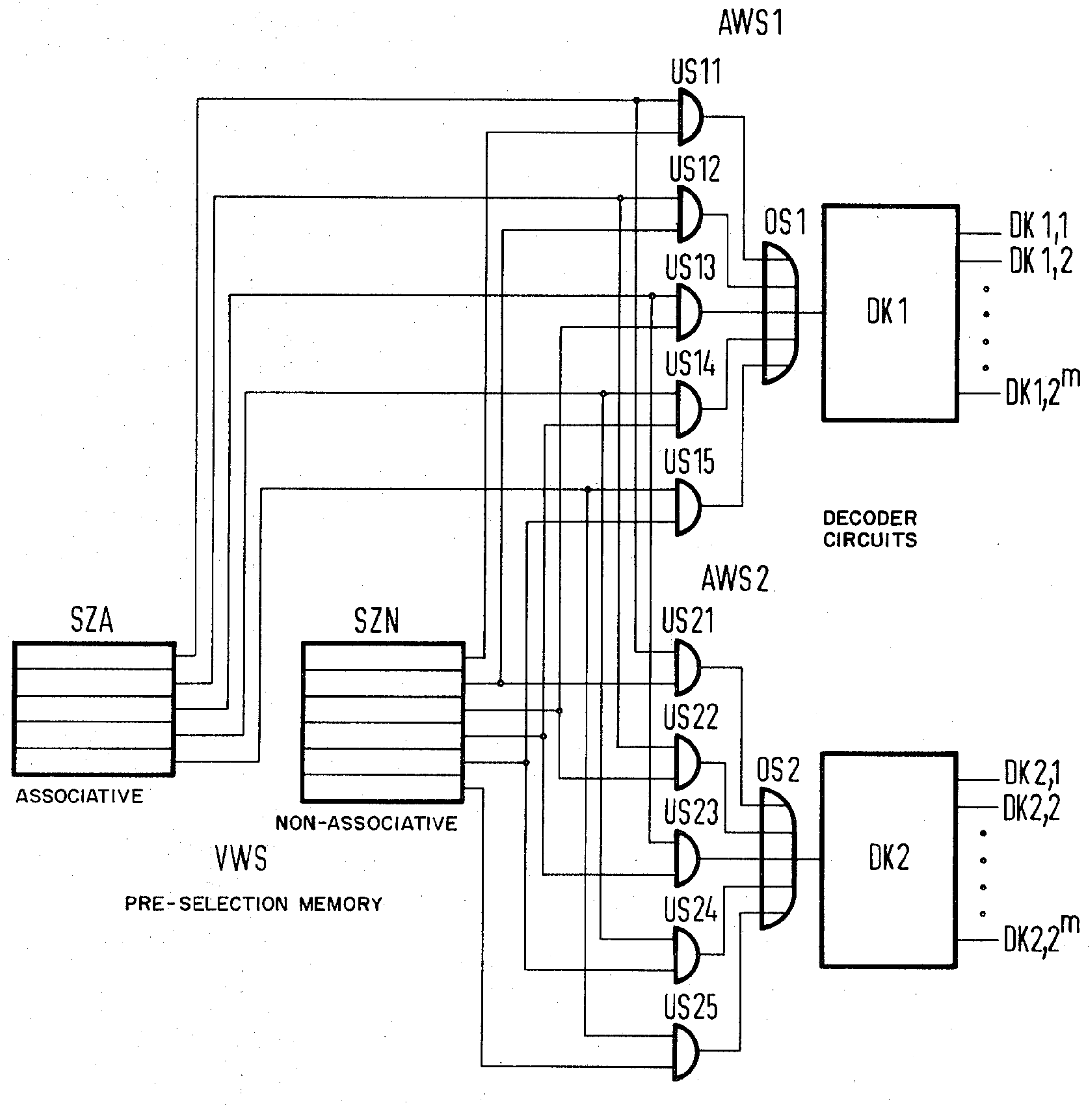

It has been shown in FIG. 2 how the selection switches AWS 1, AWS 2 may be arranged. In FIG. 4, the selection switch AWS 1 comprises AND gates US 11–US 15 and an OR gate OS-1. The selection switch AWS 2 comprises AND gates US 21–US 25 and an OR gate OS 2. The associative portion SZA of the first storage cell of the pre-selection memory is connected with the first AND gates US 11 and US 21 of the selection switches AS 1 and AS 2. The associative portion of the second storage cell is connected with the second AND gates US 12 and US 22 of the selection switches AS 1, AS 2, etc. The non-associative portion of the storage cells SZN has its memory sections respectively connected with the second inputs of the AND gates US 11–US 15, or US 21–US 25, respectively. The first storage cell, wherein the lowest cell number is stored, is connected only with the AND gate US 11 and the last storage cell, wherein the end of the storage area of the main associative memory is provided, is connected to the AND gate UG 25. The remaining storage cells are respectively connected with AND gates of the selection switch AWS 1 and the selection switch AWS 2. The AND gates of the selection switch are respectively connected to an OR gate. The OR gate OS 1 is connected to a decoding circuit DK 1. The OR gate OS 2 is connected to the decoding circuit DK 2.

If coincidence with the address portion stored in the associative portion SZA of the storage cell is detected with the help of a portion of the address, a coincidence signal will be produced in the associative portion SZA, with the help of which an AND gate US of the selection switch AWS 1 and an AND gate US of the selection switch AWS 2 is open. Therefore, the cell numbers positioned in the respective non-associative portion SZN are transferred into the decoding circuit DK 1 and DK 2. If the cell number consists of $m$ bits, then $m$ bits will respectively be transferred into the decoding circuits DK 1 and DK 2. However, it is possible to form $2^m$ different addresses with the help of $m$ bits. Therefore, each decoding circuit DK 1 and DK 2 must have $2^m$ outputs which extend toward the limit indicator GZ (FIGS. 2 and 3).

The embodiment of the decoding circuit DK 1 and DK 2 can be effected in a well known prior art manner. It may, for example, be embodied in exactly the same way as address decoding circuits with matrix memories or drum memories.

During an access to a data word of the main associative memory HAS, the low value address digits are offered to the associative portion of the main memory HAS and the higher value address digits are offered to the associative portion SZA of the pre-selection memory VWS. With a coincidence signal in the pre-selection memory VWS, the 1-bit memories of the limit indicator GZ are set, which numbers are smaller than the content of the non-associative portion of the selected storage cell in the pre-selection memory VWS, but larger or equal to the content of the non-associative portion of the preceding storage cell of the pre-selection memory VWS. Then, the coincidence signal is declared valid by the associative portion of that storage cell in the main associative memory HAS, whose associated 1-bit memory is set in the limit indicator GZ.

Setting the 1-bit memory in the limit indicator GZ is effected with the help of the two selection switches AWS 1, AWS 2 and the two decoding circuits DK1 and DK 2. The second selection switch AWS 2 will supply the content of the non-associative portion of a storage cell of the pre-selection memory VWS which has been selected during the searching process. Due to the first selection switch AWS 1, the content of the nonassociative portion of the preceding storage cell of the pre-selection memory VWS is connected to the first decoding circuit DK 1. The decoding circuits DK 1 and DK 2 decode these contents which, as it should be noted, are the cell numbers of the main associative memory, and the circuits actuate, for example, the output lines coinciding with the cell numbers and extending to the limit indicator GZ. When, for example, the cell number is provided in the non-associative portion of the selected storage cell is equal to five, the decoding circuit DK 2 will actuate the fifth output.

A possible construction of the limit indicator GZ is illustrated in FIG. 3. Each storage cell of the main associative memory HAS is assigned to a 1-bit memory SP, an AND gate KG, an OR gate OG and a NAND gate NG in the limit indicator GZ. The 1-bit memory SP is set when the OR gate OG is either supplied with an output signal from the 1-bit memory associated with the preceding storage cell or with an output signal from the first decoding circuit DK 1, particularly on its *i*-th output line, and further no output signal is applied to the NAND gate NG, from the second decoding circuit DK 2 on its *i*-th output line. Setting is effected by application of a timing pulse to the line ST via the AND gate KG. After one cycle, the 1-bit memories of the limit indicator GZ are reset.

Only those parts of the associative memory are illustrated in the drawings in FIGS. 1–4 which are required for explaining the invention. All other parts which are required for operating an associative memory and which are well know in the prior art have been omitted for reasons of simplicity and clarity.

Although I have described my invention by reference to a specific illustrative embodiment thereof, many changes and modifications may become apparent to those skilled in the art without departing from the spirit and scope of the invention. I therefore intend to include within the patent warranted hereon all such changes and modifications as may reasonably and properly be included within the scope of my contribution to the art.

I claim:

1. Associative memory apparatus in which a non-associative portion stores data words which are respectively accessed when an offered address coincides with the corresponding data address stored in an associative portion, comprising: a main memory including storage cells each having a non-associative portion and an associative portion, said non-associative portions of said cells storing data words and said associative portions of said cells storing the low value address of digits of said data words; an associative pre-selection memory connected to said main memory and including storage cells storing the higher-value address digits of said data words, said preselection memory and said associative portions of said main memory receiving an input address and including means providing coincidence signals when the high and low-value address digits of said data words correspond to said input address, said non-associative portions of said main memory responsive to and accessed by said coincidence signals, a plurality of AND gates, each gate connected between the associative and non-associative portions of a storage cell of said main memory and having an input connected to said associative portion, an output connected to said non-associative portion, and an input connected to a storage cell of said pre-selection memory, the AND gates associated with storage cells of said non-associative portions which have the same higher-value address digits stored in said pre-selection memory being combined in a group and having a common input connected to the corresponding storage cell of said pre-selection memory and operated to access the non-associative portions connected thereto in response to a coincidence signal from said pre-selection memory and a coincidence signal from one of the associative portions connected thereto.

2. The memory apparatus according to claim 1, wherein said storage cells of said main memory are assigned continuous cell members, each storage cell of said pre-selection memory comprises an associative portion and a non-associative portion storing continuous cell numbers, said non-associative portion of a storage cell of said pre-selection memory storing a cell number which is the highest of the cell numbers associated with the higher value address digits stored in the associative portion of the storage cell of the pre-selection memory, increased by 1, and which is simultaneously the lowest one of the cell numbers associated with the higher value address digits stored in the associative portion of the next storage cell of the pre-selection memory, and means operable during the selection of a storage cell of the pre-selection memory to trigger the storage cells of said main memory which have cell numbers smaller than the cell numbers stored in the non-associative portion of the storage cell of the pre-selection memory but larger than or equal to the cell number stored in the non-associative portion of the preceding storage cell of the selection memory.

3. The memory apparatus according to claim 2, comprising first and second selection switches, connected to said storage means said first selection switch connected to receive the contents of the non-associative portions of the storage cells of the pre-selection memory and said second selection switch connected to receive the contents of the non-associative portions of the storge cells of the pre-selection memory, said selection switches connected so that during a selection the content of the non-associative portion of a selected storage cell is provided to said second selection switch and the content of the non-associative portion of the preceding storge cell is provided to said first selection switch, first and second decoding circuits connected to said first and second selection switches, respectively, a limit indicator circuit comprising a plurality of single bit memories respectively associated with each storage cell of the main memory and a logic circuit connecting said single bit memories to said decoding circuit and operable to effectively trigger with said decoding circuits each single bit memory whose assigned storage cell in the main memory have a cell number which is smaller than the content of the non-associative portion of the selected storage cell of the pre-selection memory and larger than or equal to the content of the non-associative portion of the preceding storage cell of the pre-selection memory, AND gates associated with said storage cells of said main memory connected to said single bit memories so that one of said AND gates provides an output signal for triggering the non-associative portion of a storage cell of said main memory whose corresponding single bit memory is set and which recieves a coincidence signal from the associative portion of the storage cell of said main memory.

4. The memory apparatus according to claim 3, wherein said limit indicator circuit comprises a plurality of OR gates, a plurality of NAND gates, and a plurality of other AND gates, each of said single bit memories having a setting input and an output, said setting input connected to the output of one of said other AND gates and said output connected to the input of a respective first-mentioned AND gate and to an input of one of said OR gates, said OR gates each having another input connected to said first decoding circuit and an output connected to an input of said other AND gate, said NAND gate having an input connected to said second decoding circuit and an output connected to another input of said other AND gate, said other AND gate having a further input for receiving a clock pulse providing the setting time of said single bit memories.

* * * * *